(12) United States Patent
Nguyen et al.

(10) Patent No.: US 9,645,585 B2
(45) Date of Patent: May 9, 2017

(54) VARIABLE FLOW DIGITAL GAS VALVE

(75) Inventors: Tam Nguyen, Orland Park, IL (US);
James D. Kimble, DeKalb, IL (US)

(73) Assignee: Robertshaw Controls Company,
Itasca, IL (US)

( * ) Notice: Subject to any disclaimer, the term of this patent is extended or adjusted under 35 U.S.C. 154(b) by 2612 days.

(21) Appl. No.: 12/354,541

(22) Filed: Jan. 15, 2009

(65) Prior Publication Data

US 2010/0176323 A1 Jul. 15, 2010

(51) Int. Cl.
*G05D 7/06* (2006.01)
*F16K 27/00* (2006.01)
*F16K 11/24* (2006.01)
*F16K 27/02* (2006.01)
*F16K 31/06* (2006.01)

(52) U.S. Cl.
CPC ............ *G05D 7/0652* (2013.01); *F16K 11/24* (2013.01); *F16K 27/003* (2013.01); *F16K 27/029* (2013.01); *F16K 27/0263* (2013.01); *F16K 31/0679* (2013.01); *Y10T 137/86493* (2015.04); *Y10T 137/87265* (2015.04); *Y10T 137/87298* (2015.04); *Y10T 137/87306* (2015.04); *Y10T 137/87314* (2015.04); *Y10T 137/87507* (2015.04)

(58) Field of Classification Search
CPC ..... Y10T 137/87265; Y10T 137/87507; Y10T 137/87298; Y10T 137/87314; Y10T 137/87306; G05D 7/0652; F16K 27/003

USPC ........... 137/599.01, 599.05, 599.06, 599.07, 137/601.14
See application file for complete search history.

(56) References Cited

U.S. PATENT DOCUMENTS

| | | | | |
|---|---|---|---|---|
| 3,905,394 A | * | 9/1975 | Jerde ......................... | 137/599.04 |
| 3,942,553 A | * | 3/1976 | Gallatin ................... | 137/599.07 |
| 4,019,533 A | * | 4/1977 | Jerde et al. ............... | 137/599.07 |
| 4,148,340 A | * | 4/1979 | Hutton ..................... | 137/599.07 |
| 4,170,245 A | * | 10/1979 | Haley ........................ | 137/487.5 |

(Continued)

FOREIGN PATENT DOCUMENTS

| CA | 2166733 A1 | 7/1997 |
|---|---|---|
| EP | 0 836 054 B1 | 12/2001 |

(Continued)

*Primary Examiner* — Atif Chaudry
(74) *Attorney, Agent, or Firm* — Reinhart Boerner Van Deuren P.C.

(57) ABSTRACT

A variable flow rate gas control valve for use in consumer and commercial appliances is presented. The valve utilizes two or more solenoids to control the operating position of two different valve members whose orifices are sized in an exponential relationship with one another. By opening one or more of the valving members in various combinations, a variable flow rate of gaseous fuel may be controlled in integer multiple steps from full off to full on. The solenoid configurations may be in line, opposing, or symmetrical about an axis of the valve. The number of unique flow rates (F) is related to the number of solenoids (N) as $F=2^N$. The relationship between the size (S) of the individual gas control orifices for each of the solenoids is related to N by the relationship $S=2^{n-1}$ for each individual gas control orifice (n) numbered 1 to N.

1 Claim, 7 Drawing Sheets

(56) References Cited

U.S. PATENT DOCUMENTS

| | | | | |
|---|---|---|---|---|
| 4,725,040 | A | * | 2/1988 | Fornuto et al. .......... 251/129.15 |
| 4,768,544 | A | * | 9/1988 | Beam et al. ............. 137/315.04 |
| 5,458,294 | A | | 10/1995 | Zachary et al. |
| 5,937,884 | A | | 8/1999 | Barnoin et al. |
| 6,032,667 | A | | 3/2000 | Heinonen |
| 6,148,862 | A | * | 11/2000 | Doll ............................. 137/884 |
| 6,202,699 | B1 | * | 3/2001 | Meyer et al. ................. 137/884 |
| 6,405,752 | B1 | * | 6/2002 | Fritsch et al. ................ 137/550 |
| 2007/0125356 | A1 | | 6/2007 | Crnkovich |

FOREIGN PATENT DOCUMENTS

| | | |
|---|---|---|
| JP | 56006962 A | 1/1981 |
| JP | 2037248 A | 2/1990 |
| JP | 6002942 A | 1/1994 |

* cited by examiner

VARIABLE FLOW DIGITAL GAS VALVE

FIELD OF THE INVENTION

This invention relates generally to gas control valves for consumer and commercial appliances, and more particularly to variable flow rate gas control valves for consumer and commercial appliances.

BACKGROUND OF THE INVENTION

Consumer and commercial gas burning appliances, such as ovens, clothes dryers, hot water heaters, etc., typically utilize a gas control flow valve that controls the flow of gaseous fuel to a burner. The appliance controller typically monitors user inputs and a temperature of the oven cavity, dryer drum, water storage tank, etc. to determine when a call for heat is required. Once the controller determines that a call for heat is required, the controller will open the gas control valve and energize the ignition circuitry at the burner to ignite the gaseous fuel being released therefrom. The controller continues to monitor the temperature of the oven cavity, dryer drum, water storage tank, etc. until it determines that a call for heat is no longer required. At such point, the controller turns off the gas control valve to extinguish the flame at the burner.

While the user typically sets a desired temperature set point for the appliance, and while the controller attempts to regulate the temperature at the user set point, the use of an on-off gas control valve limits the ability of the controller to maintain the temperature at the user selected set point. This is because the status of the burner is only controllable between full off and full burner on operating modes. When the burner is turned off, the temperature in the temperature regulated area of the appliance will drop based on ambient conditions and operation of the appliance. Once the temperature has dropped below a historicize level set by the controller, the burner is turned on. With the burner turned full on, the temperature rise in the appliance will be rather significant, at least compared to the temperature drop, in most appliance applications. Such on-off control, therefore, results in relatively wide and varying rate temperature deviations from the user set point.

To minimize these problems, some consumer and commercial appliances have begun to incorporate pulse width modulated gas control valves that can provide for a varying flow rate of gas to the burner. The availability of a variable gas flow rate based upon the duty cycle at which the pulse width modulated gas control valve is operated eliminates the wide temperature swings and heating and cooling rates that plague the on-off gas control mechanisms. Indeed, varying the duty cycle at which the gas control valve is modulated allows the appliance controller to vary the heating level from high to low to more precisely control the temperature of the appliance. In other words, by varying the relative amount of time that the modulated gas control valve is open and closed allows the controller to vary the amount of gas flowing to the burner between the maximum flow rate when the valve is open at the maximum duty cycle to a minimum flow rate when the valve is modulated at a minimum duty cycle.

While such pulse width modulation of the gas control valve provides a significant advantage over the previous on-off control in those appliance applications that need such more precise control, such pulse width modulation increases the complexity of the controller and associated drive circuitry, and therefore increases the cost over the prior on-off controls. Further, since the pulse width modulation operates to repeatedly open and close the gas control valve to regulate the flow of gas therethrough, the valve seat experiences increased wear due to the increased number of times that it is opened and closed.

Further, since the solenoid coil has an inductance associated therewith, the rate at which the current is changed will influence the coil voltage as governed by the equation $V=L\,di/dt$. Such modulation, therefore, will also increase the wear on the coil itself, and will limit the duty cycle at which the coil may be operated, thereby limiting the minimum amount of gaseous fuel that may be flowed therethrough. This flow rate limitation will also be influenced by the mechanical inertia that is inherent in the mechanical plunger that positions the valve seat in an opened or closed position. Additionally, such control strategies may increase the power consumption of the appliance due to the solenoid coil inrush current and because more time is spent overcoming the opening force of the valve seat than the on-off control, recognizing that the holding power requirement is much less than the opening power requirement of a typical valve.

In view of the above, there is a need in the art for a variable gas flow control valve that may be used in commercial and consumer appliances that better regulates the temperature thereof, but which does not suffer from the problems associated with pulse width modulated variable flow gas valves. Embodiments of the present invention provide such a variable flow rate gas control valve. These and other advantages of the invention, as well as additional inventive features, will be apparent from the description of the invention provided herein.

BRIEF SUMMARY OF THE INVENTION

In view of the above, embodiments of the present invention provide a new and improved gas control valve. More particularly, embodiments of the present invention provide a new and improved gas control valve for consumer and commercial appliances that is capable of providing a variable flow of gaseous fuel therethrough. Still more particularly, embodiments of the present invention provide a new and improved variable flow rate gas control valve that utilizes two or more solenoids to control individual valving members, each valving member having a gas control orifice that is uniquely sized in relationship to the gas control orifices of the other valving members.

In one embodiment of the present invention, the variable flow rate gas control valve is a digital gas valve having multiple individually controlled solenoid coils that provide a variable flow of gaseous fuel therethrough. Each solenoid coil, when opened, allows gaseous fuel to flow through its gas control orifice and to the valve outlet, resulting in variable rates of gas flow depending on the number and combination of coils opened at any one time. If one coil is energized so that its valving member is opened, the gas flow rate out of the valve is equal to the rate provided by that coil's gas control orifice size. If more than one coil is energized at any one time, the resulting gas flow output is equivalent to the sum of the individual flow rates through the gas control orifices of the opened valving members. As such, this embodiment of the present invention provides a total number of unique flow rates that can be delivered to a burner that is expedientially related to the number of solenoid coils and, by default, the number of unique gas control orifices. In an embodiment of the present invention having two coils/orifices, a total of four unique gas flow rates including off are provided. An embodiment having three coils/orifices results in eight unique rates including off, etc.

In embodiments of the present invention, the solenoid configurations may be driven by installation or flow requirements, and may include inline configurations, opposing configurations, symmetrical configurations about an axis, etc. In an embodiment of the present invention that utilizes an aluminum housing, the individual valve seats may be machined into the housing and the gas control orifices drilled therethrough, each orifice being of a varying size. In embodiments that utilize extremely small orifices, the gas control orifice's size may be controlled by using a stamped orifice cup similar to that used in gas standing-pilot assemblies. Combinations of these may be used in a single embodiment.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
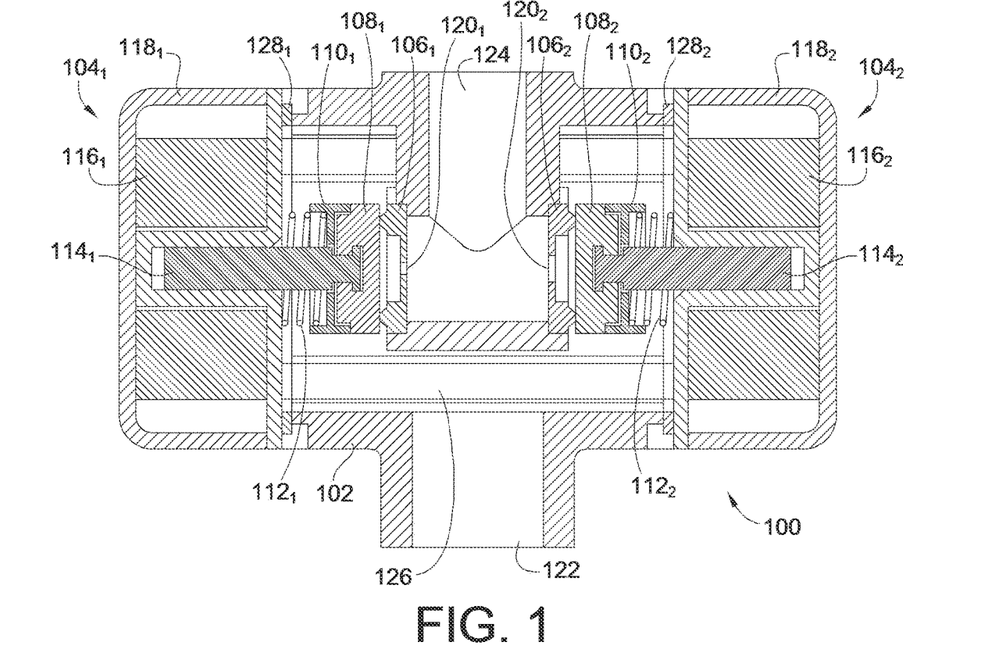
FIG. 1 is a cross-sectional illustration of an embodiment of a variable flow digital gas control valve constructed in accordance with the teaching of the present invention utilizing an opposing configuration.

Turning now to the drawings, there is illustrated in FIG. 1 a cross-sectional illustration of one embodiment of a variable flow digital gas valve 100 constructed in accordance with the teachings of the present invention. As discussed above, such a variable flow digital gas valve 100 may find particular applicability in consumer and commercial appliances such as oven, clothes dryers, hot water heaters, fireplaces, etc. It should be noted, however, that while such operating environments aid in the understanding of the function and construction of such a valve, particular embodiments of the present invention are not so limited to that particular operating environment as will become apparent to those skilled in the art from the following description. As such, such descriptions should be taken by way of example and not by way of limitation.

As may be seen from the cross-sectional illustration of FIG. 1, the variable flow digital gas valve 100 of this embodiment of the present invention includes a housing 102 to which are affixed multiple solenoid coil assemblies $104_1 \ldots N$, where N is the total number of solenoid coil assemblies. The embodiment illustrated in FIG. 1 includes two solenoid coil assemblies $104_1$, $104_2$. In the following description, the subscript for the constituent elements of the solenoid coil assemblies will not be used when the description pertains to each of such elements for all of the assemblies. When different operation requires, the subscripts will again be used to specifically identify which elements are being discussed.

Each of the solenoid assemblies 104 control the position of a valve seal 108 relative to a valve seat 106 to control the flow of gaseous fuel through the valve 100. In the illustrated embodiment, a valve washer 110 is used to carry a valve spring 112, which positions the plunger 114 such that the valve seal 108 is seated against the valve seat 106 in a quiescent or un-energized position. In this embodiment, the quiescent state is off such that no gaseous fuel flows. Other embodiments may be configured to have the quiescent state be on such that the solenoid coil assembly 104 must be energized to close the valve seal 108 against the valve seat 106.

As will be recognized by those skilled in the art, the solenoid assembly 104 also includes a coil 116 and ferromagnetic frame 118. When the coil 116 is energized, the magnetic field generated thereby causes the plunger 114 to move against the force of the valve spring 112 to lift the valve seal 108 from the valve seat 106. This allows gaseous fuel to flow through the gas control orifice 120, which provides a flow of the gaseous fuel from the inlet 122 to the outlet 124 via the inlet gas manifold 126. In the embodiment illustrated in FIG. 1, a solenoid mounting seal 128 is used to close the inlet gas manifold 126 when the solenoid assembly 104 is connected to the housing 102. Embodiments of the present invention may use a single solenoid mounting seal 128 for each solenoid coil assembly 104, or may use a single solenoid mounting seal 128 for groups or sets of solenoid coil assemblies 104 as will be made apparent from the following description.

As will be discussed in greater detail below, the amount of gas flowing from the inlet 122 to the outlet 124 is controlled by the number and configuration of the solenoid coil assemblies 104 that are energized and the relative size of the individual gas control orifices 120 associated therewith. Indeed, the size of the gas control orifice 120 of the valve seat 106 may be formed by machining the valve seat 106 as part of the housing 102 and drilling the gas control orifice 120 therethrough. In another embodiment the valve seat 106 including the gas control orifice 120 can be formed as a separate element or cup that may be installed into the housing 102 during the assembly process of the valve 100. In still another embodiment the valve seat 106 can be machined into the housing 102 and only the gas control orifice 120 can be formed as a separate element or cup that may be installed into the housing 102 during the assembly process of the valve 100. In these later embodiments, different operating characteristics may be achieved with a single housing 102 by simply changing the cups to have different sized gas control orifices 120 installed therein.

Unique to the embodiments of the variable flow digital gas valve 100 of the present invention is the relationship between the number of solenoid assemblies 104 and the size of each of the gas control orifices 120 associated therewith. Specifically, each gas control orifice 120 associated with each solenoid coil assembly 104 is exponentially related to provide an expedientially increasing number of distinct flow rates available through the valve 100.

Specifically, the number of unique flow rates (F) is related to the number of individual solenoid coil assemblies 104 (N) by the equation $F=2^N$. This relationship holds so long as each of the gas control orifices 120 for each of the individual solenoid coil assemblies 104 is uniquely sized. In one embodiment, the relationship between the size (S) of the individual gas control orifices 120 for each of the individual solenoid coil assemblies 104 is also related to the number (N) of the solenoid coil assemblies 104 by the relationship $S=2^{n-1}$ for each gas control orifice numbered 1 to N.

With these two relationships in mind, it can be seen that the embodiment of the valve 100 illustrated in FIG. 1 having two solenoid coil assemblies $104_1$, $104_2$ allows for four unique flow rates (including off) to be controlled through the valve 100. When the individual gas control orifices 120 are controlled based upon the above described relationship, the size of orifice $120_1$ may be described as "1", while the size of the orifice for the gas control orifice $120_2$ will be "2." Such a configuration uses the relative size or normalized size of the gas control orifice 120 as the relative or normalized flow rate. In such an embodiment the four flow rates of 0, 1, 2, and 3 are available and will be described below in relation to FIGS. 1, 2, 3, and 4, respectively.

Specifically, when both solenoid coil assemblies $104_1$, $104_2$ are deenergized or in their quiescent state as illustrated in FIG. 1, no gaseous fuel may flow from the inlet 122 to the outlet 124 because each of the valve seals $108_1$, $108_2$ are held against their associated valve seats $106_1$, $106_2$ by the force of their individual valve springs $112_1$, $112_2$.

Figure 2:
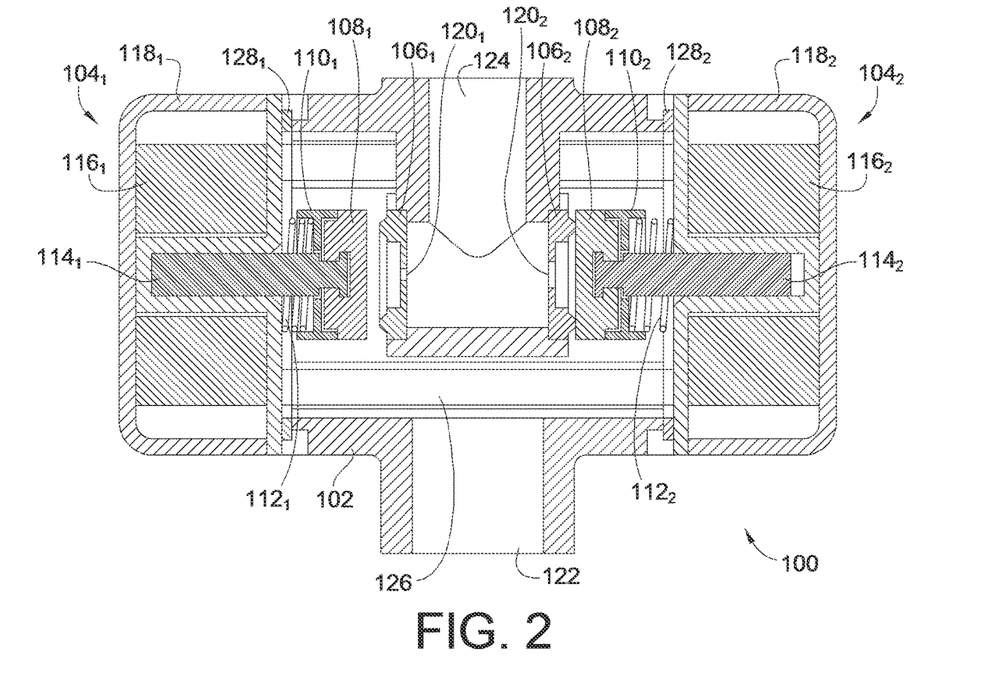
FIG. 2 is a cross-sectional illustration of the embodiment of a variable flow digital gas control valve shown in FIG. 1 illustrating an operating mode thereof.

To change from a flow rate of 0 (off) to the minimum flow rate of 1, the coil $116_1$ is energized to retract the plunger $114_1$ against the force of the valve spring $112_1$, thereby removing the valve seal $108_1$ from the valve seat $106_1$. This allows gaseous fuel to flow from the inlet gas manifold 126 through the gas control orifice $120_1$, to the outlet 124. Since the gas control orifice $120_1$ is sized at a relative size of "1," the flow rate from the inlet 122 to the outlet 124 can be thought of as a flow rate of "1."

Figure 3:
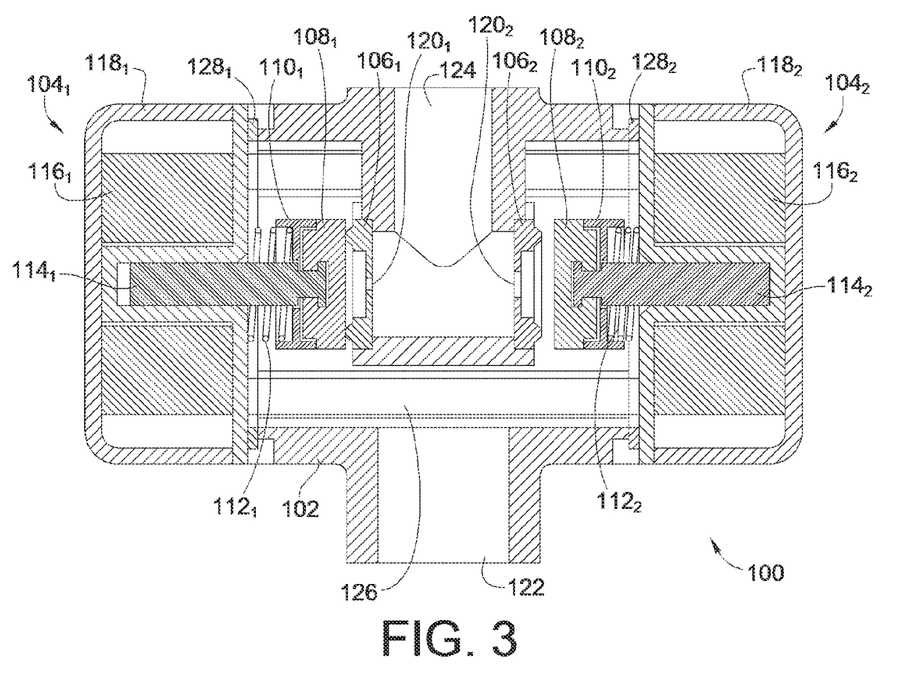
FIG. 3 is a cross-sectional illustration of the embodiment of a variable flow digital gas control valve shown in FIG. 1 illustrating a further operating mode thereof.

To provide the next flow rate of 2, the solenoid coil $116_1$ is deenergized and the solenoid coil $116_2$ of the solenoid coil assembly $104_2$ is energized. This results in the valve seal $108_1$ being reseated on the valve seat $106_1$ under the force of the valve spring $112_1$ since the coil $116_1$ is no longer energized and producing a magnetic field. Conversely, the energization of the coil $116_2$ will generate a magnetic field that will withdraw the plunger $114_2$ such that the valve seal $108_2$ is withdrawn from the valve seat $106_2$. This allows gaseous fuel to flow from the inlet gas manifold 126 through the gas control orifice $120_2$ to the outlet 124 as illustrated in FIG. 3.

Figure 4:
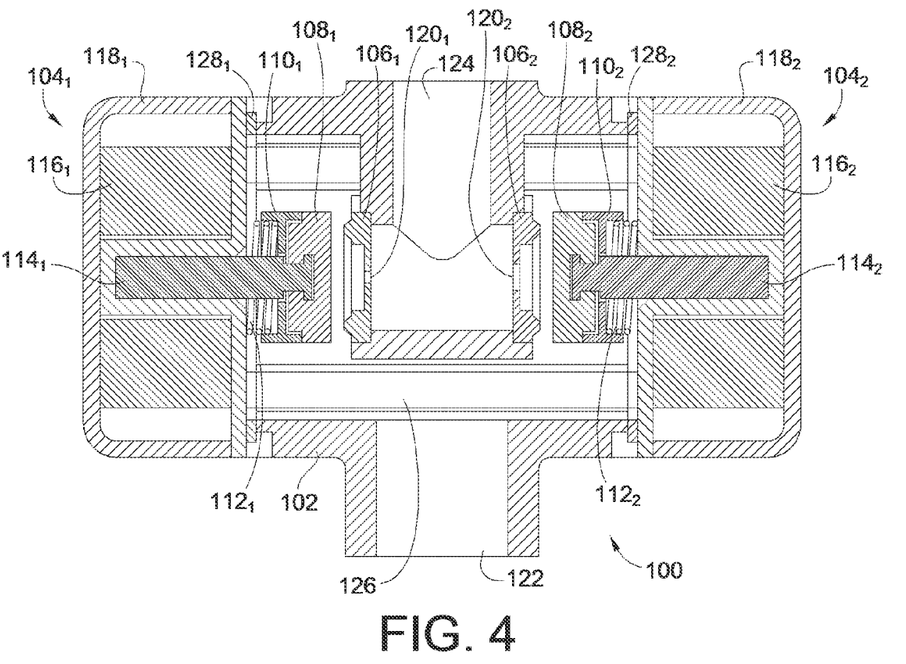
FIG. 4 is a cross-sectional illustration of the embodiment of a variable flow digital gas control valve shown in FIG. 1 illustrating a still further operating mode thereof.

To increase the flow rate through the valve 100 to its maximum relative flow of 3, both coils $116_1$, $116_2$ are energized to move the valve seals $108_1$, $108_2$ off of their associated valve seat $106_1$, $106_2$ as illustrated in FIG. 4. This allows gaseous fuel to flow from the inlet gas manifold 126 through both of the gas control orifices $120_1$, $120_2$ to the outlet 124.

Figure 5:
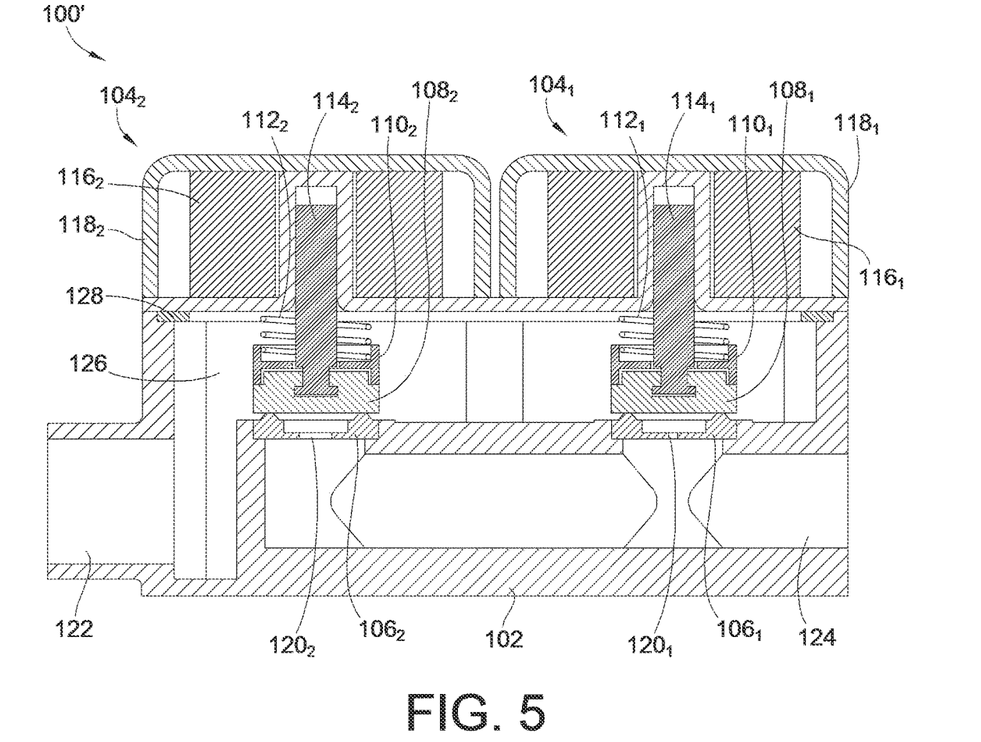
FIG. 5 is cross-sectional illustration of an alternate embodiment of a variable flow digital gas control valve constructed in accordance with the teaching of the present invention utilizing an in-line configuration.

While the embodiment illustrated in FIGS. 1-4 utilize an opposing mounting configuration of the solenoid coil assemblies $104_1$, $104_2$, the embodiment illustrated in FIG. 5 utilizes an inline configuration. While providing identical flow rate control as discussed above, this inline configuration only utilizes a single solenoid mounting seal 128. It should be noted, however, that other inline configurations may provide individual mountings for each individual solenoid coil assembly 104, each of which would then be sealed by an individual solenoid mounting seal 128 to prevent the inadvertent escape of gaseous fuel therethrough.

Figure 6:
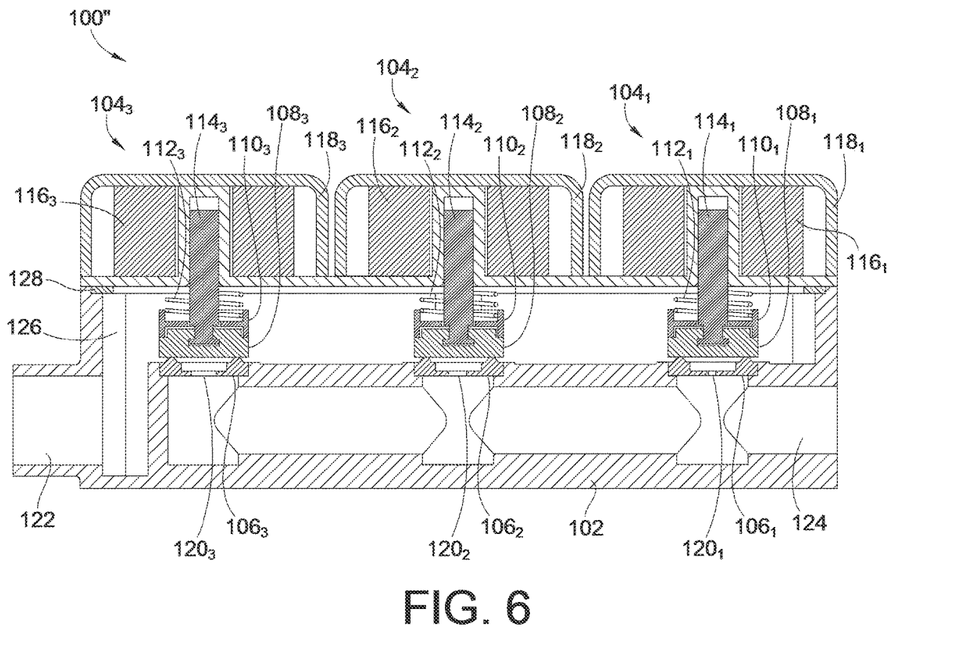
FIG. 6 is cross-sectional illustration of an alternate embodiment of a variable flow digital gas control valve constructed in accordance with the teaching of the present invention utilizing three solenoid coil assemblies arranged in an in-line configuration.

The embodiment of the variable flow digital gas valve 100 illustrated in FIG. 6 utilizes three solenoid coil assemblies $104_1$, $104_2$, $104_3$, and provides a total of eight distinct flow rates (including off) in accordance with the relationship $F=2^3$. The relative sizes of the gas control orifices $120_1$, $120_2$, $120_3$ are 1, 2, 4 in accordance with the relationship $S=2^{n-1}$ discussed above. As will now be apparent to those skilled in the art from the foregoing description, control of each of the individual solenoid coil assemblies $104_1$, $104_2$, $104_3$ can provide flow rates of 0, 1, 2, 3, 4, 5, 6, and 7 as illustrated by Table 1, below:

TABLE 1

| Flow Rate | Solenoid #1 | Solenoid #2 | Solenoid #3 |
|---|---|---|---|
| 0 | OFF | OFF | OFF |
| 1 | ON | OFF | OFF |
| 2 | OFF | ON | OFF |
| 3 | ON | ON | OFF |
| 4 | OFF | OFF | ON |
| 5 | ON | OFF | ON |
| 6 | OFF | ON | ON |
| 7 | ON | ON | ON |

Figure 7:
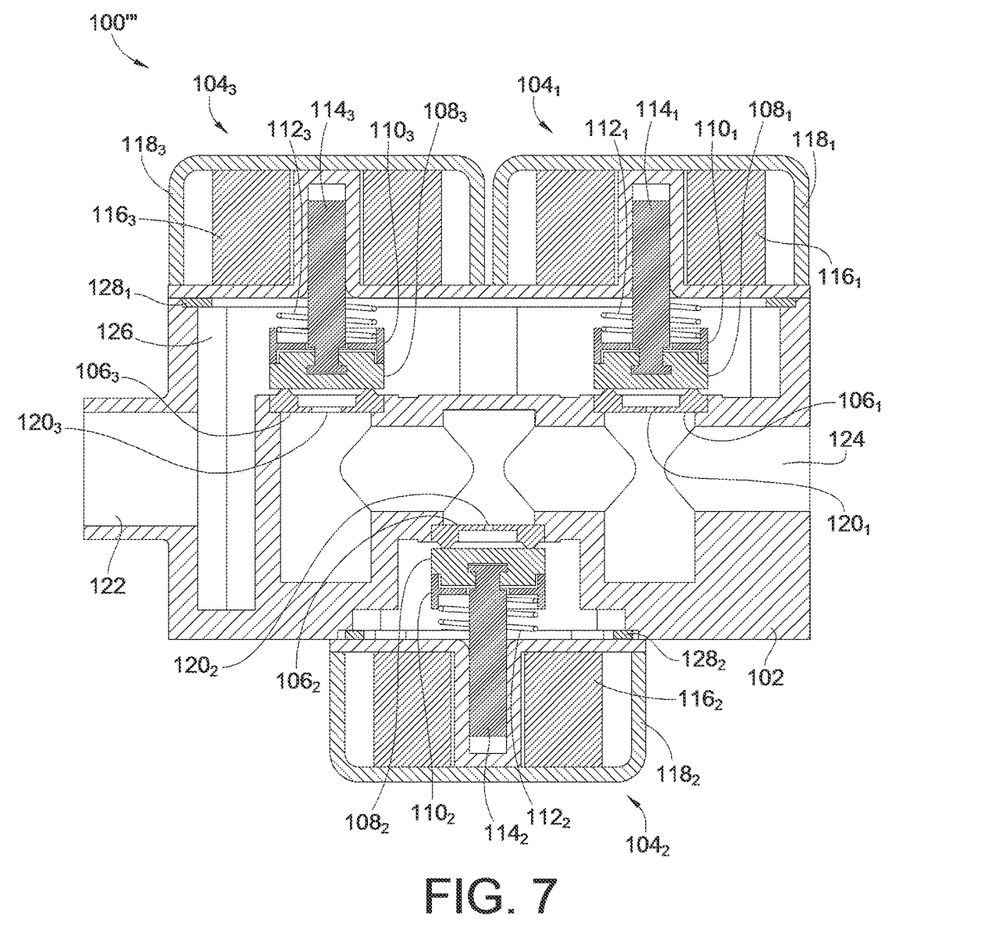
FIG. 7 is cross-sectional illustration of an alternate embodiment of a variable flow digital gas control valve constructed in accordance with the teaching of the present invention utilizing three solenoid coil assemblies arranged in an opposing configuration.

As illustrated in FIG. 7, a three solenoid coil assembly embodiment may also utilize an opposing mounting configuration as opposed to the inline configuration shown in FIG. 6. Such an embodiment as shown in FIG. 7 is shorter than the embodiment shown in FIG. 6, due to the opposition mounting of the solenoid coil assemblies 104, and may be beneficial to certain installations that would not accommodate a longer valve.

Figure 8:
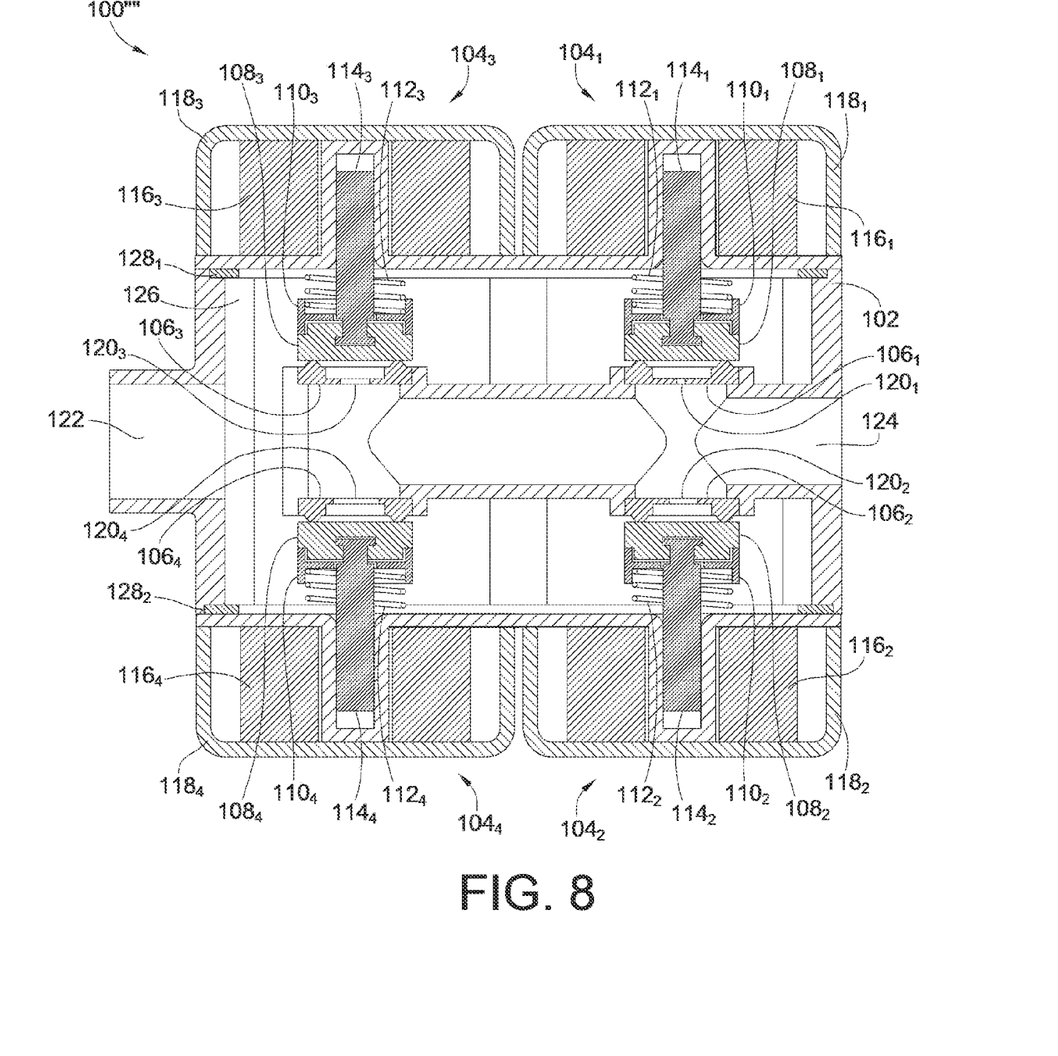
FIG. 8 is cross-sectional illustration of an alternate embodiment of a variable flow digital gas control valve constructed in accordance with the teaching of the present invention utilizing four solenoid coil assemblies arranged in an opposing configuration.

In installations that require finer control or more total individual flow rates, the embodiment illustrated in FIG. 8 utilizing four solenoid coil assemblies $104_1$, $104_2$, $104_3$, $104_4$ may be utilized. The control and operation of this embodiment is similar as that described above and provides a total of 16 different flow rates (including off). When the size of the individual gas control orifices 120 are controlled based on the relationship described above, i.e. relative sizes of 1, 2, 4, and 8, this embodiment provides flow rates of 0, 1, 2, 3, 4, 5, 6, 7, 8, 9, 10, 11, 12, 13, 14, and 15 when the individual solenoid coil assemblies 104 are energized in accordance with Table 2, below:

TABLE 2

| Flow Rate | Solenoid #1 | Solenoid #2 | Solenoid #3 | Solenoid #4 |
|---|---|---|---|---|
| 0 | OFF | OFF | OFF | OFF |
| 1 | ON | OFF | OFF | OFF |
| 2 | OFF | ON | OFF | OFF |
| 3 | ON | ON | OFF | OFF |
| 4 | OFF | OFF | ON | OFF |
| 5 | ON | OFF | ON | OFF |
| 6 | OFF | ON | ON | OFF |
| 7 | ON | ON | ON | OFF |
| 8 | OFF | OFF | OFF | ON |
| 9 | ON | OFF | OFF | ON |
| 10 | OFF | ON | OFF | ON |
| 11 | ON | ON | OFF | ON |
| 12 | OFF | OFF | ON | ON |
| 13 | ON | OFF | ON | ON |
| 14 | OFF | ON | ON | ON |
| 15 | ON | ON | ON | ON |

Figure 9:
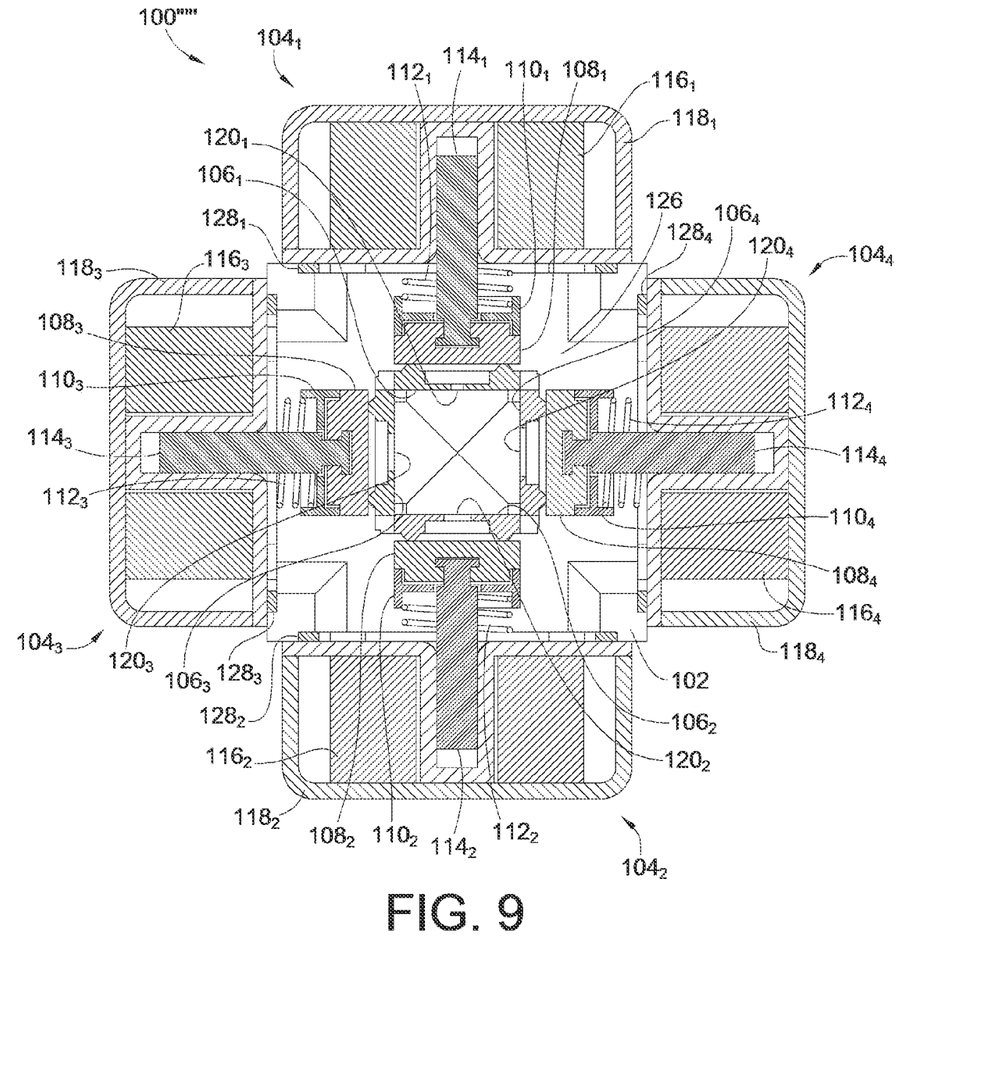
FIG. 9 is cross-sectional illustration of an alternate embodiment of a variable flow digital gas control valve constructed in accordance with the teaching of the present invention utilizing four solenoid coil assemblies arranged in a symmetrical configuration.

While the illustration of FIG. 8 shows the solenoid coil assemblies 104 configured in an opposing relationship, and while a four solenoid coil assembly can also be configured in an inline relationship similar to those shown in FIGS. 5 and 6, FIG. 9 illustrates a further embodiment utilizing a symmetrical solenoid coil assembly mounting configuration. In this embodiment, the inlet and outlet lie upon an axis extending through the page through the center of the valve assembly. Such a solenoid coil assembly mounting configuration, which is available for any number of solenoid coil assemblies, may be particularly useful in installations that only provide a length between the inlet and outlet mounting plumbing that will only accommodate the width of a single solenoid coil assembly 104, but which is not constrained in terms of the overall width of the valve. Indeed, in such an installation, the four solenoid coil assembly, sixteen individual flow rate embodiment of FIG. 9 may be installed in the same length as the two solenoid four flow rate embodiment shown in FIG. 1.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A variable flow digital gas valve, comprising:
a housing defining an inlet and an outlet;
at least two gas control orifices positioned in the housing between the inlet and the outlet to control fluid communication between the inlet and the outlet, each of the at least two gas control orifices being sized differently to allow a different flow therethrough;
a solenoid coil assembly associated with each of the at least two gas control orifices, the solenoid coil assembly controlling a position of a valve seal to control fluid communication between the inlet and the outlet through its associated gas control orifice; and
wherein each solenoid coil assembly is independently controllable such that $2^N$ different flow rates are provided, where N is a total number of gas control orifices provided in the housing;
wherein the at least two solenoid coil assemblies are mounted to the housing in an opposing configuration; and
wherein at least one of the gas control orifices is formed as a stamped orifice cup, the stamped orifice cup being affixed in the housing.

* * * * *